United States Patent

[19]

Perry

[11] 4,222,480
[45] Sep. 16, 1980

[54] 90° SWEEPOUT DRIVE MECHANISM

[75] Inventor: Jack I. Perry, Toledo, Ohio

[73] Assignee: Owens-Illinois, Inc., Toledo, Ohio

[21] Appl. No.: 946,903

[22] Filed: Sep. 28, 1978

[51] Int. Cl.³ .................... B65G 47/04; B65G 47/82
[52] U.S. Cl. ...................................... 198/490; 74/411
[58] Field of Search ................. 198/490; 74/409, 411; 65/260; 64/DIG. 2

[56] References Cited

U.S. PATENT DOCUMENTS

| | | | |
|---|---|---|---|
| 3,249,200 | 5/1966 | Rowe | 198/490 |
| 3,249,201 | 5/1966 | Rydlewicz | 198/490 |
| 3,595,365 | 7/1971 | Faure | 198/490 |
| 3,716,126 | 2/1973 | Perry et al. | 198/490 X |
| 3,795,503 | 3/1974 | Perry | 65/260 |

Primary Examiner—Jeffrey V. Nase
Attorney, Agent, or Firm—D. T. Innis; M. E. Click; D. H. Wilson

[57] ABSTRACT

Apparatus for moving newly formed glass containers from a cooling dead plate to a moving machine conveyor in which the ware is engagedf by a finger, with the finger being generally horizontal and engageable with the container at a point on its sidewall which best suits the moving of the container by a sliding motion. The finger, or fingers in the case of plural containers being simultaneously moved, is moved through an arc approximately 90° with respect to its vertical axis, moving the containers from the dead plate to the conveyor and then the finger is retracted out of contact with the containers on the conveyor. The cylinder for extending and retracting the fingers is mounted on the upper end of a vertical shaft, the shaft being oscillated through approximately 90°. In the drive mechanism for the shaft, a sprocket-carrying housing surrounding the shaft is provided with an internally contained, flat spiral spring which connnects the housing to a coaxially positioned sleeve. The sleeve is fixed to the shaft by a disc, with the disc carrying a pin that rides in a slot formed in the lower surface of the sprocket. Oscillatory movement of the sprocket will drive the shaft and in the event interference occurs, the spring will take up the slack of the 90° of movement without imposing a damaging force on the head of the mechanism.

6 Claims, 8 Drawing Figures

90° SWEEPOUT DRIVE MECHANISM

BACKGROUND OF THE INVENTION

In the operation of 90° sweepout mechanisms for glassware forming machines of the IS type wherein a driven sprocket is coupled to the drive shaft of the sweepout through a clutching arrangement, it has been the practice in the past, as shown in U.S. Pat. No. 3,249,200, to couple the driven sprocket to the vertical shaft by means of a spring-biased detent which will release in the event the sweepout mechanism becomes jammed. It should be understood that the sprocket is driven from a cam which is rotated continuously and the follower of the cam is connected to the chain. The chain is springbiased to aid in keeping the follower riding against the cam. The mechanical portions of this drive are relatively strong and will be capable of creating damage in the upper portion of the sweepout mechanism such as breaking the sweepout fingers or the like. The detent system which is shown in some detail in FIG. 5 of the above-mentioned patent, permits the sprocket to cycle through its normal oscillations without forcing the sweepout motor to oscillate if interference with the motor is present. Once the detent is out of the hole in the sprocket, return of the detent into the hole in the sprocket must be accomplished in order for the mechanism to be capable of performing the sweepout functions. A system for assuring such return was the subject of applicant's prior U.S. Pat. No. 3,716,126 issued Feb. 13, 1973. This Perry patent shows a mechanical arrangement for rephasing the detent mechanism during the next cycle of the sprocket oscillation. The present invention is considered an improvement over this prior patent.

SUMMARY OF THE INVENTION

Ware transfer mechanism in which an improved spring off-set sprocket assembly for a 90° sweepout is provided in which a sprocket driven housing surrounds the drive shaft and is coupled to the drive shaft through a lost-motion mechanical linkage and a tensioned, flat spiral spring.

DETAILED DESCRIPTION OF THE DRAWINGS

Figure 1:
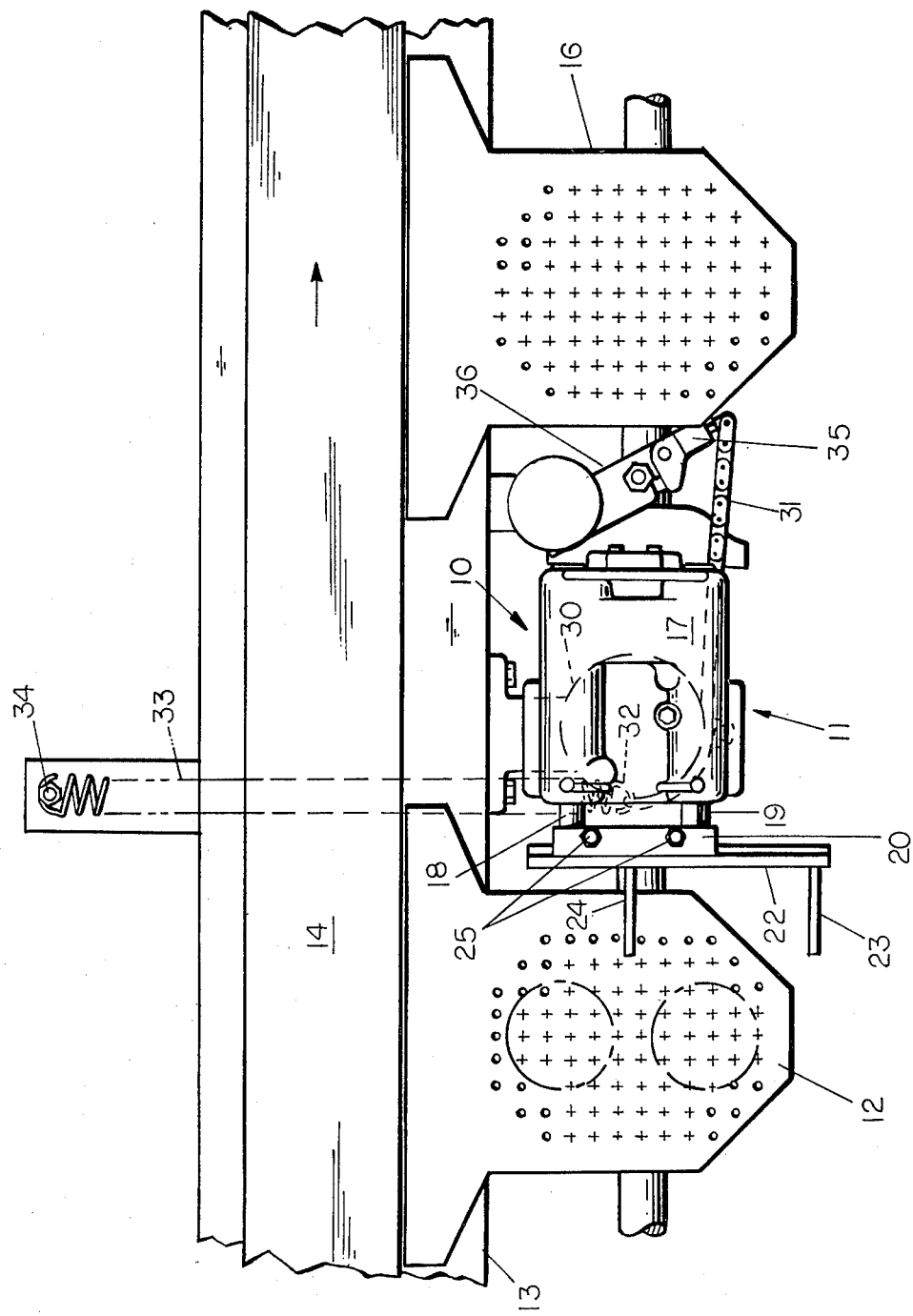
FIG. 1 is a top plan view of the sweepout mechanism of the invention in its environment.
Figure 2:
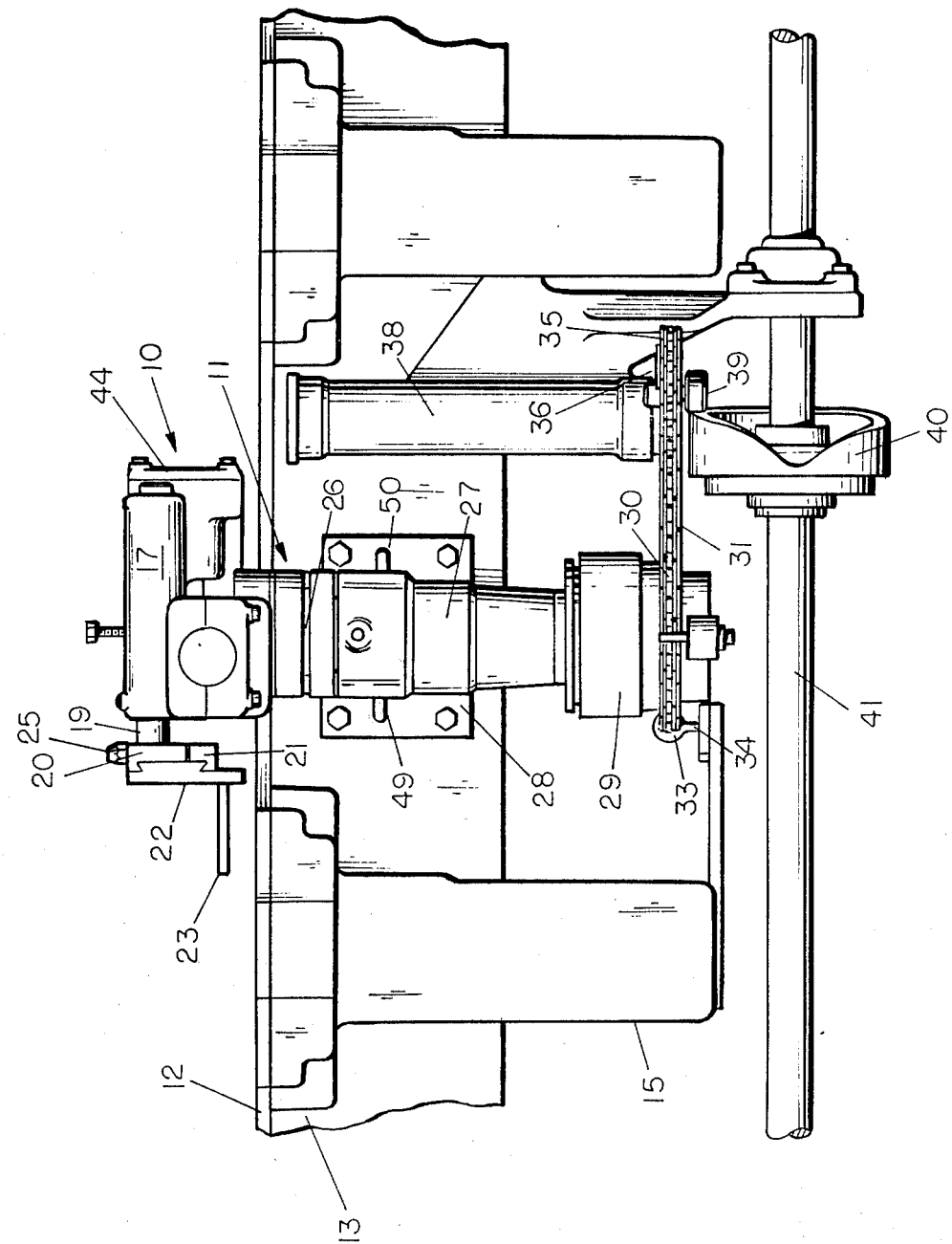
FIG. 2 is a side elevational view of the apparatus of FIG. 1.

With particular reference to FIGS. 1 and 2, the general arrangement of the apparatus of the invention will be described. The previously mentioned fluid motor is generally designated by the reference numeral 10. In the various figures of the drawings and the base to which the motor is mounted, is generally designated by numeral 11.

As shown in FIGS. 1 and 2, the motor 10 is positioned on the base 11 to generally face in the direction of a dead plate 12. It should be understood that the dead plate 12 is of a size to receive a pair of newly formed glass containers on its upper surface in approximately the location of the dotted circles shown thereon. Dead plate 12 is fixed to the side of a conveyor 13 which has an upper surface 14 moving in the direction of the arrow shown thereon in FIG. 1.

In conventional practice, the conveyor 13 has a generally rectangular shape in cross section, and is also utilized to carry cooling air that is fed into a plenum chamber 15 beneath the cooling dead plate 12. The cooling air then exits through the numerous perforations formed in the surface of the dead plate 12. A similar dead plate 16 is positioned adjacent to the dead plate 12, it being understood that the dead plate 16 will receive ware from another section of a forming machine and also will be handled by a sweepout mechanism of the same design as that to be described in detail below.

The fluid motor 10 and its base 11 are oscillated between the position shown in FIG. 1 to a position which would be 90° in a clockwise direction, as viewed in FIG. 1. In its turned position, the motor 11 would face in the direction of the moving conveyor surface 14. This 90° movement of the motor 10 will provide for sweeping containers from the dead plate 12 onto the surface 14 of the conveyor 13. Fluid motor 10 is preferably pneumatic and is of the reversible type. Housing 17 of the motor is stationary and upon actuation of the motor a pair of rods 18 and 19 will be moved in and out. The outer ends of the rods 18 and 19 carry a cross bar 20. The cross bar 20, in cooperation with a clamp bar 21, forms a dovetail slot facing in the direction of the dead plate 12. Within this dovetail slot is positioned an elongated bar 22 carrying a pair of spaced-apart fingers 23 and 24. The cross bar and the clamp bar are held together by a threaded bolt which extends from the clamp bar 21 through openings formed in the cross bar 20 and held together by acorn nuts 25. The horizontal position of the bar 22 relative to the conveyor may obviously be adjusted, and while the present bar is shown as carrying two fingers, it should be obvious that any combination of fingers could be likewise carried by the bar 22 and could be adjusted horizontally relative to the clamp bar 21.

The base 11 of the motor 10 is connected to a vertical shaft 26 that extends downwardly through a support housing 27. The housing 27 is carried by a plate 28 that is bolted to the side of the conveyor 13. The casting which forms the plate 28 also includes passages therein for providing fluid access to the fluid motor mounted thereabove, through the base 11. Generally speaking, the shaft 26 extends downward into a lower housing 29. The housing 29 is provided with a sprocket 30 which is engaged by an elongated chain 31. Chain 31 has one end 32 connected to a long spring 33, with the spring 33 being anchored at its opposite end at 34 to a stationary portion of the machine conveyor support. The other end of the chain 31 is connected to an extended end 35 of an arm 36. The arm 36 is mounted for pivotal movement about the vertical axis of a shaft (not shown). The shaft is fixed in position within a housing 38. Intermediate its length, the arm 36 is provided with a cam follower roller 39. The cam follower roller 39 is in engagement with a barrel cam 40 carried by a horizontal shaft 41 which is driven by the main machine timing system. The foregoing is a general explanation of the operation of the sweepout mechanism.

Operating air for reciprocating the motor 10 is supplied through pipes 49 and 50 connected to the support housing 27. It should be pointed out that these pipes are connected through internal passages (not shown) to the motor 10.

Figure 3:
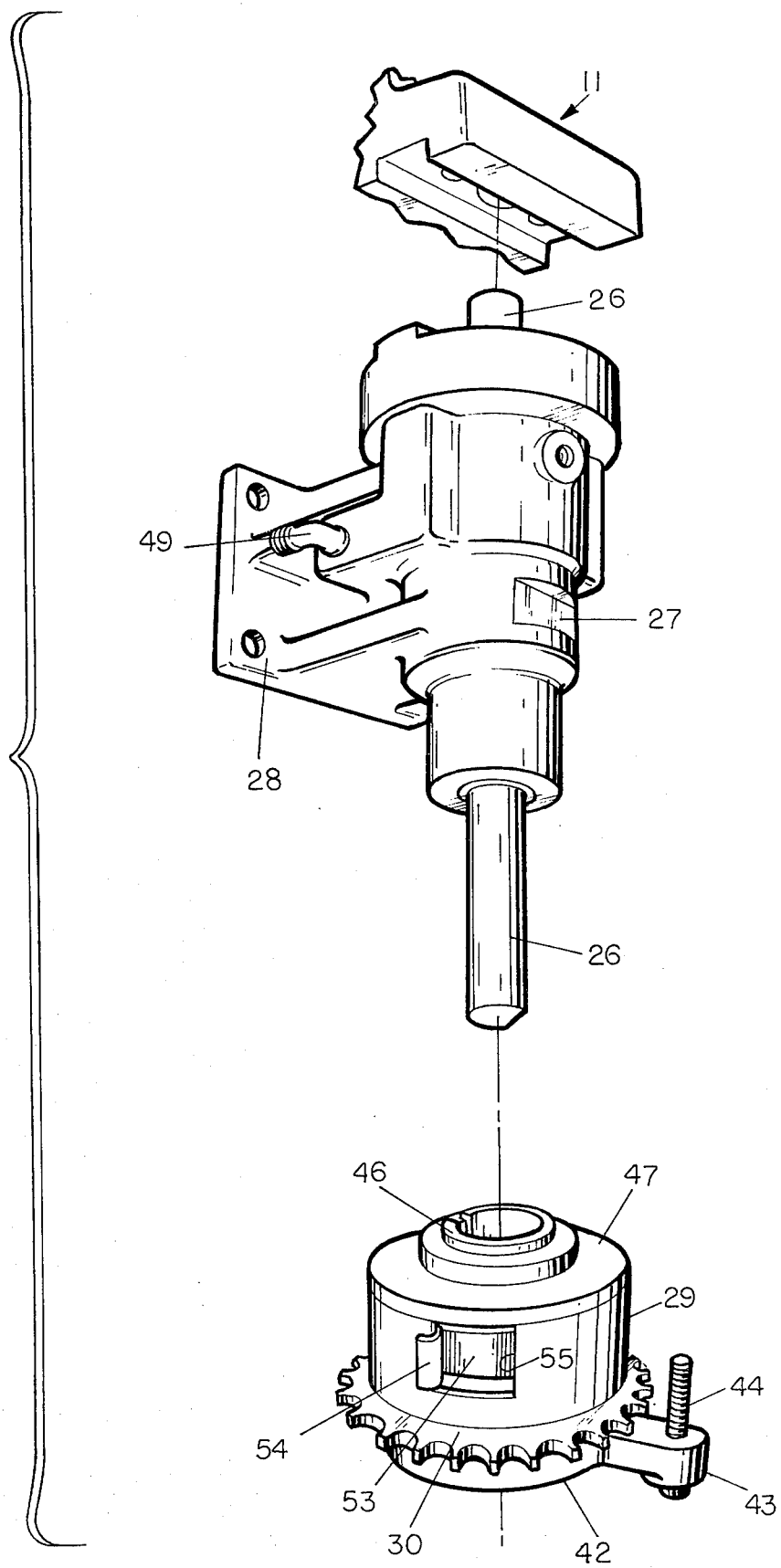
FIG. 3 is an exploded perspective view of the support housing and lower housing of the invention.
Figure 4:
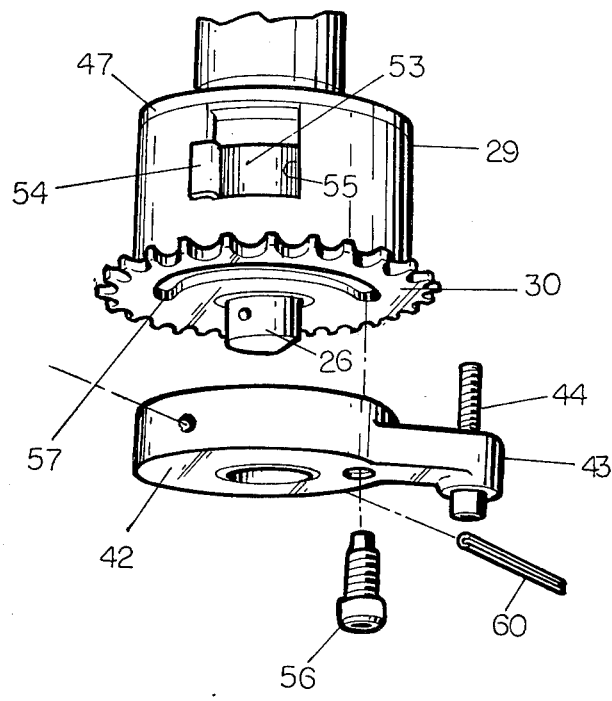
FIG. 4 is an exploded perspective view looking upward showing the lower housing of the invention.

Turning now to FIGS. 3 and 4, it can be seen that the lower housing 29 and the sprocket 30 are supported by the shaft 26. The housing 29 and the sprocket 30, in effect, are a single unit which are drivingly connected to the shaft 26 through a lower, separate disc 42. The disc 42 has a radially extending arm portion 43 through which a threaded bolt 44 extends in a vertical direction, with the bolt 44 serving as a means to retain the chain 31 on the sprocket 30.

Figure 6:
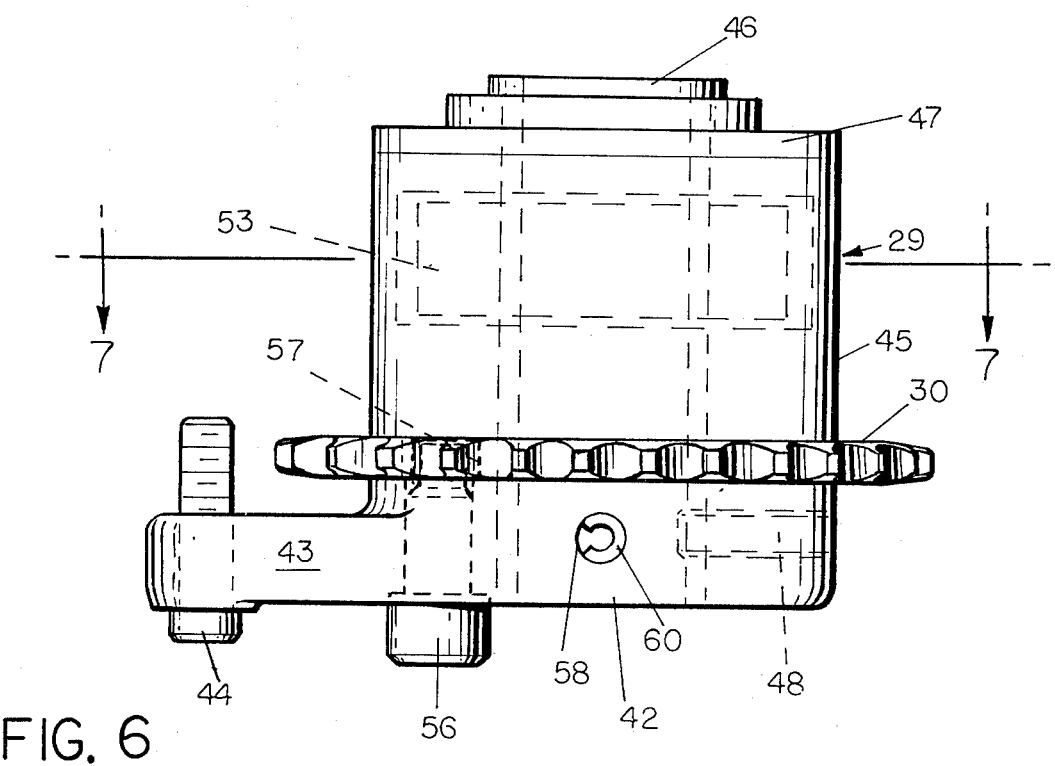
FIG. 6 is a side elevational view of the apparatus of FIG. 5.
Figure 5:
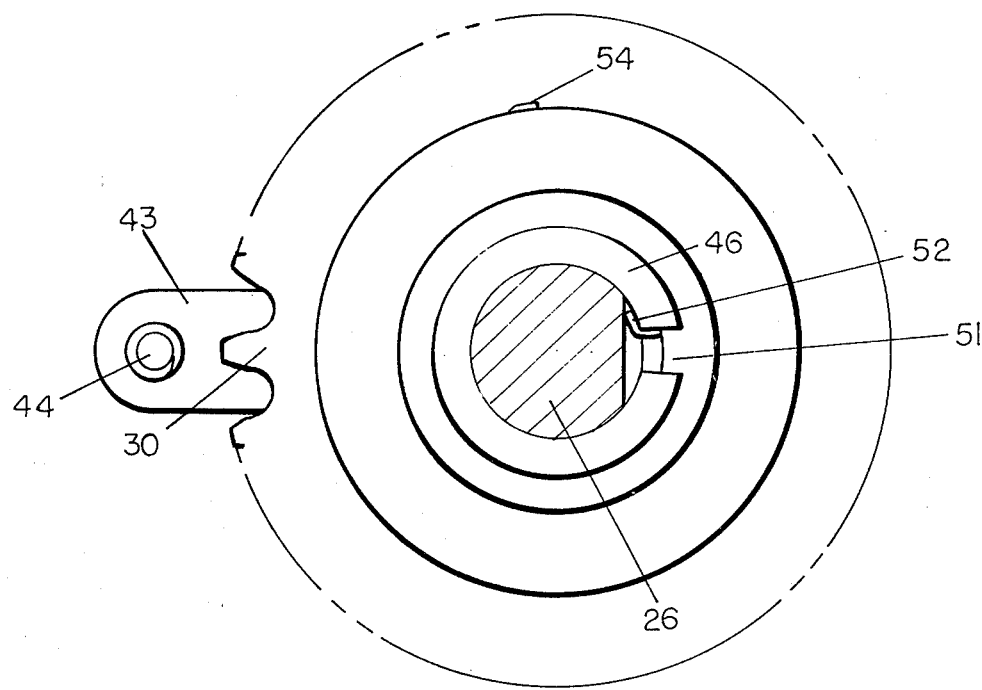
FIG. 5 is a top plan view of the sprocket-carrying housing of the invention.

The housing 29, as best seen in FIGS. 5 and 6, comprises an outer cylindrical portion 45 to the lower edge of which the sprocket 30 is fixed. A sleeve 46 extends axially downwardly through the member 29 and serves as the means that supports the housing on the shaft 26. An upper or top closing cap 47 surrounds the upper portion of the sleeve and fits over the upper end of the cylinder portion 45 of the housing 29. It should be understood that the sprocket 30 is annular and that the sleeve 46 extends down through the center of the sprocket and the disc 42, and when in assembled form, a set screw 48 carried in the disc 42 will extend through the sidewall of the disc and engage the sleeve and through an opening formed in the sleeve 46 to engage the shaft 26 during the assembly procedure, later to be described.

The sprocket, in its lower face, is provided with a slot 57 which has a circumferential length of somewhat greater than 90°. The upper end of a screw 56 extending through and threaded in the disc 42, is adapted, upon assembly of the components, to be positioned within the slot 57. The sleeve 46 is provided with an opening 51 intermediate its height within which a bent end 52 of an elongated, generally flat, spring member 53 is held. An opposite end 54 of the spirally wound flat spring member 53 is also provided with a hook-like configuration and is hooked through an opening 55 in the side of the housing 29. The disc 42 is fixed to the shaft 26 by means of a roll pin 58 which extends diametrically through the disc and shaft. The passage for the roll pin is actually drilled after the mechanism is assembled.

The foregoing constitutes a description of the essential parts of the force or torque limiting coupling between the driven sprocket 30 and the shaft 26. In order to better understand the invention and its function in service, the following description of the steps carried out in assembling the unit is as follows.

The combined sprocket and housing 29 and 30, cover 47 and sleeve 46 are assembled with the disc 42. The set screw 48 is threaded through the opening in the side of the disc 42 and extends through an opening provided in the sleeve 46. The screw 56 is started in the tapped hole in the disc 42, but is not allowed to rub along the face or engage the slot of the sprocket 30. The end 52 of the spring member 53 is inserted through the opening 55 in the housing 29 and is hooked through the opening 51 formed in the sleeve 46. The housing 29 is held against rotation and the disc 42 is rotated in a clockwise direction until the spring 53 has its other end 54 hooked to the edge of the opening 55 in the housing 29. Rotation of the disc 42 is continued until the spring is wound solid with a degree of force of 40–60 inch pounds. The disc 42 is then unwound one-third to one and one-third turns and the screw 56 is tightened into the slot 57 in the sprocket 30. With the screw in the slot, the disc is permitted to rotate freely until it stops. This will occur when the screw 56 comes to rest against the end of the slot 57 in the sprocket 30.

Figure 7:
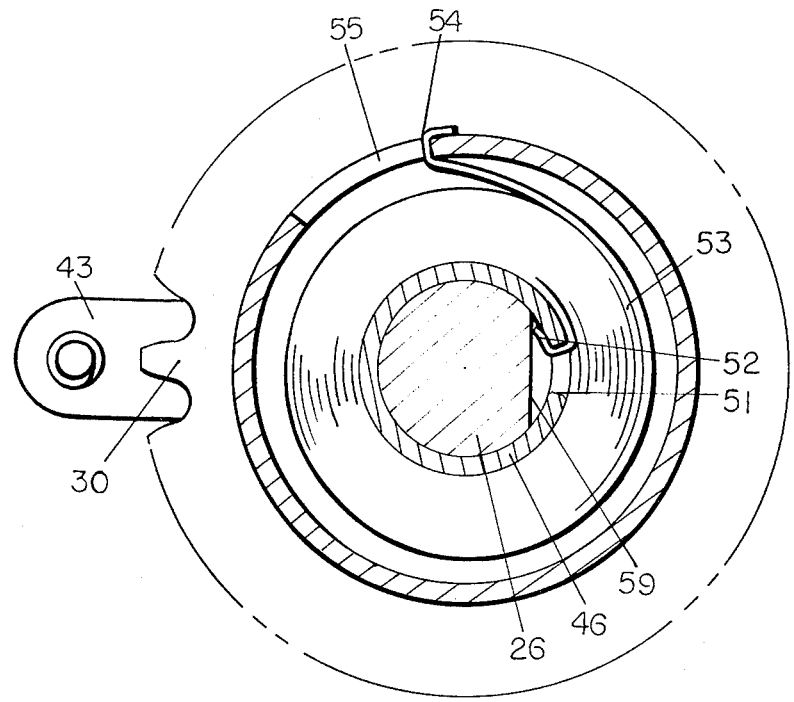
FIG. 7 is a cross sectional view taken at line 7—7 of FIG. 6.
Figure 8:
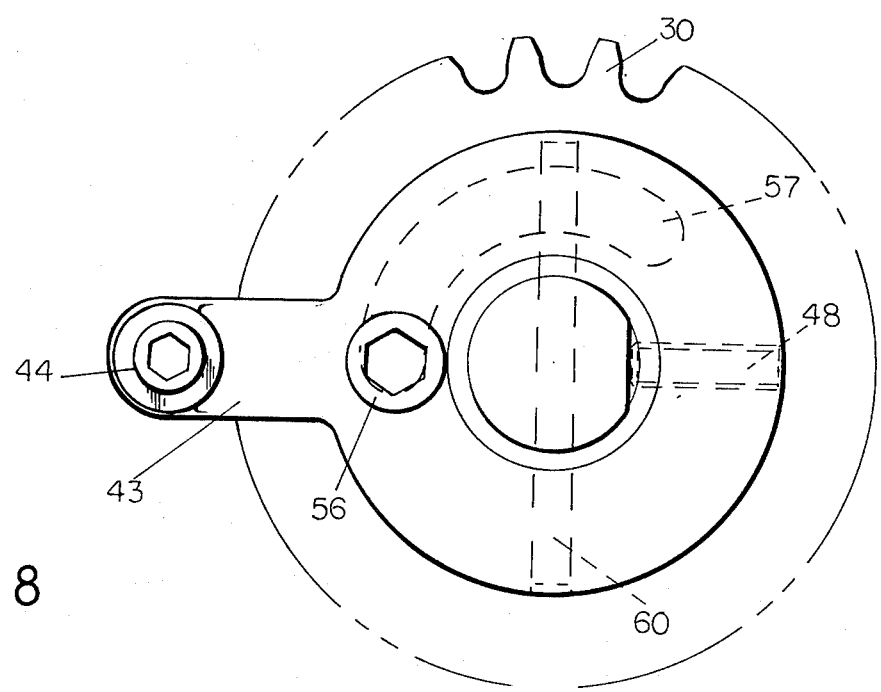
FIG. 8 is a bottom view of the apparatus of FIG. 6.

The spring assembly is now ready to be installed on the shaft 26. The shaft 26 will have, as best shown in FIG. 7, a flat at 59 on one side thereof, with the end 52 of the spring being provided for in the area between the flat 59 and the sleeve 46. The shaft also is provided with a machined section so that after assembly of the unit 29 onto the shaft, it may be rotated somewhat relative to the shaft an amount to ensure its location. Once the assembly 29 is in position on the shaft, a hole 60 is drilled diametrically through the disc 42 and the shaft 26, and then the roll pin 58 is inserted through the opening 60 joining the disc and shaft together.

As previously explained, the unit 10 to which the sprocket is attached by the shaft 26 must rotate 90° during normal operation and this is accomplished by attaching the chain 31 around approximately 90° of this sprocket. As previously explained, one end of the chain is attached to an arm 36 which has the cam follower 39 that works against the open-faced cam 40. The other end of the chain 31 is attached to the tension spring 33. This tension spring encourages the follower 39 to stay against the cam face as the cam 40 turns. If this unit will not rotate as the cam follower is urged to follow the cam face to the lowest point of the cam, then the only torque load seen by the unit will be that developed by the tension spring 33 and the cam follower will not follow the cam path. If, however, the unit 10 has moved to a position where the cam follower 39 is at the lowest point of the cam path and the unit will not rotate back, then the sprocket assembly will allow itself to rotate while transmitting only the torque of the motor spring to the unit 10.

In the foregoing manner a maximum controlled torque transmission is provided between the drive shaft 26 and the drive gear or sprocket 30.

I claim:

1. In sweepout mechanism for a glass forming machine wherein a vertical shaft, carrying retractable sweepout fingers, is oscillated through approximately 90° about its axis by the turning of a sprocket which is mounted for rotation on the shaft, the improvement in the drive connection between the sprocket and shaft comprising:

a disc member fixed to said shaft, said sprocket mounted on said shaft in juxtaposition to said disc member;

a circumferential slot formed in said sprocket and extending approximately 90° of the circumference of said sprocket;

a pin mounted to said disc member and extending into said slot; and spring means extending between said sprocket and shaft for yieldingly maintaining said pin at one end of said slot.

2. The sweepout mechanism for a glass forming machine of claim 1 wherein said spring means comprises:

a sleeve mounted on said shaft;

a housing mounted on the sleeve for rotation relative thereto;

a flat coil spring member within said housing and having one end held in a slot in the sleeve with the opposite end of said spring being held in a slot formed in the housing; and means mounting said drive sprocket on said housing.

3. In sweepout mechanism for a glass forming machine wherein a vertical shaft, carrying retractable sweepout fingers, is oscillated through approximately 90° about its axis by the turning of a sprocket which is connected to the shaft, the improvement in the connection between the sprocket and shaft comprising:

a sleeve mounted on said shaft;

a housing mounted on the sleeve for rotation relative thereto and carrying said sprocket;

a flat coil spring member within said housing and having one end held in a slot in the sleeve;

the opposite end of said spring being held in a slot formed in the housing;

a circumferential slot formed in the face of said drive sprocket;

a disc fixed to the lower end of said shaft; and a pin mounted on said disc and extending into said slot in said sprocket.

4. The apparatus of claim 3 further including means extending upward from said disc in close proximity to the circumference of said sprocket for retaining a drive chain on said sprocket.

5. In sweepout mechanism for a glass forming machine wherein a vertical shaft, carrying retractable sweepout fingers, is oscillated through approximately 90° about its axis by the turning of a drive sprocket which is connected to the shaft, the improvement in the connection between the sprocket and shaft comprising:

a housing mounted on the shaft adjacent the lower end thereof for rotation relative thereto;

a flat, coil spring member within said housing and having one end fixed relative to said shaft with the opposite end thereof held in a slot formed in the housing;

said drive sprocket mounted on said housing for rotating said housing against said spring;

a semi-circumferential slot formed in the face of said sprocket;

a disc fixed to the lower end of said shaft; and a follower pin carried by said disc extending into said slot whereby relative motion of said sprocket and housing is limited by the extent of said slot.

6. The apparatus of claim 5 further including a radial extension on said disc and a screw extending through said extension in close proximity to said sprocket for retaining a chain in engagement with said sprocket.

* * * * *